(12) United States Patent
Keskitalo et al.

(10) Patent No.: US 10,299,245 B2
(45) Date of Patent: May 21, 2019

(54) MME ASSISTED SYSTEM INFORMATION UPDATE

(71) Applicant: Nokia Solutions and Networks Oy, Espoo (FI)

(72) Inventors: Ilkka Antero Keskitalo, Oulu (FI); Jussi-Pekka Koskinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/771,564

(22) PCT Filed: Jan. 29, 2016

(86) PCT No.: PCT/EP2016/051962
§ 371 (c)(1),
(2) Date: Apr. 27, 2018

(87) PCT Pub. No.: WO2017/129261
PCT Pub. Date: Aug. 3, 2017

(65) Prior Publication Data
US 2018/0324747 A1    Nov. 8, 2018

(51) Int. Cl.
| | | |
|---|---|---|
| *H04W 68/00* | (2009.01) | |
| *H04W 68/02* | (2009.01) | |
| *H04W 76/28* | (2018.01) | |
| *H04W 48/08* | (2009.01) | |
| *H04W 52/02* | (2009.01) | |
| *H04W 68/08* | (2009.01) | |

(52) U.S. Cl.
CPC ........... *H04W 68/02* (2013.01); *H04W 48/08* (2013.01); *H04W 52/0225* (2013.01); *H04W 76/28* (2018.02); *H04W 68/08* (2013.01)

(58) Field of Classification Search
CPC ..... H04W 68/02; H04W 76/28; H04W 48/08; H04W 52/0225
See application file for complete search history.

(56) References Cited

U.S. PATENT DOCUMENTS

| | | | |
|---|---|---|---|
| 2015/0304986 A1 | 10/2015 | Eriksson et al. | |
| 2016/0192292 A1* | 6/2016 | Hoglund | H04W 52/0216 370/311 |
| 2018/0317198 A1* | 11/2018 | Lee | H04W 4/70 |

FOREIGN PATENT DOCUMENTS

| | | |
|---|---|---|
| WO | WO 2015/020590 A1 | 2/2015 |
| WO | WO 2016/003174 A1 | 1/2016 |

OTHER PUBLICATIONS

Qualcomm etal RP-150493, New WI Proposal: RAN enhancements for extended DRX in LTE; 2015; 3GPP TSG RAN Meeting #67 Shanghai, China, Mar. 9 -12, 2015.

(Continued)

*Primary Examiner* — Khai M Nguyen
(74) *Attorney, Agent, or Firm* — Harrington & Smith (57) ABSTRACT

It is provided a method, including monitoring if an information on an update of a system information of a first cell is received; checking if a terminal is registered as being served by at least one cell of a group of one or more cells including the first cell; checking if the terminal becomes reachable after being asleep; requesting to page the terminal by a paging message if the information on the update is received, the terminal is served by the at least one cell of the group, and the terminal becomes reachable, wherein the paging message includes an indication on the update.

22 Claims, 3 Drawing Sheets

(56) References Cited

OTHER PUBLICATIONS

3GPP 3GPP TS 36.331 V12.7.0 (Sep. 2015) 2015; Technical Specification Group Radio Access Network; Evolved Universal Terrestrial Radio Access (E-UTRA); Radio Resource Control (RRC); Protocol specification (Release 12).

* cited by examiner

MME ASSISTED SYSTEM INFORMATION UPDATE

FIELD OF THE INVENTION

The present invention relates to an apparatus, a method, and a computer program product related to system information update. More particularly, the present invention relates to an apparatus, a method, and a computer program product related to MME assisted system information update.

ABBREVIATIONS 3G 3$^{rd}$ Generation
3GPP 3$^{rd}$ Generation Partnership Project
5G 5$^{th}$ Generation
BCCH Broadcast Control Channel
BCH Broadcast Channel
CMAS Commercial Mobile Alert Service
DRX Discontinuous Reception
eDRX extended DRX
eNB evolved Node-B
EAB Extended Access class Barring
ETWS Earthquake and Tsunami Warning System
I-eDRX eDRX for an UE in idle state
IE Information Element
LTE Long Term Evolution
MIB Master Information Block
MTC Machine Type Communication
PF Paging Frame
PO Paging Occasion
RAN Radio Access Network
Rel Release
RRC Radio Resource Control
SFN System Frame Number
SI System Information
SIB System Information Block
TS Technical Specification
UE User Equipment
WI Work Item

BACKGROUND OF THE INVENTION

In LTE systems and LTE-A systems, the system information is defined by one or more system information blocks (SIB) and a master information block (MIB). The system information may comprise one or both of non-access stratum and access stratum related information. For the purpose of the present application, a MIB is considered as a particular kind of a SIB if not otherwise stated or made clear from the context.

In LTE systems and LTE-A systems, the MIB and one SIB (SystemInformationBlockType1, also named SIB1) are regularly broadcasted on the BCH at predetermined points of time. SystemInformationBlockType1 informs the UE on the time when the other SIBs are broadcasted.

In LTE systems and LTE-A systems, a concept of a BCCH modification period is used for changes (updates) of the system information (SI), i.e. a change of SI (other than for ETWS, CMAS and EAB parameters) only occurs at specific radio frames. The BCCH modification period boundaries are defined by SFN values for which SFN mod m=0, where m is the number of radio frames comprising the BCCH modification period [1].

Figure 1:
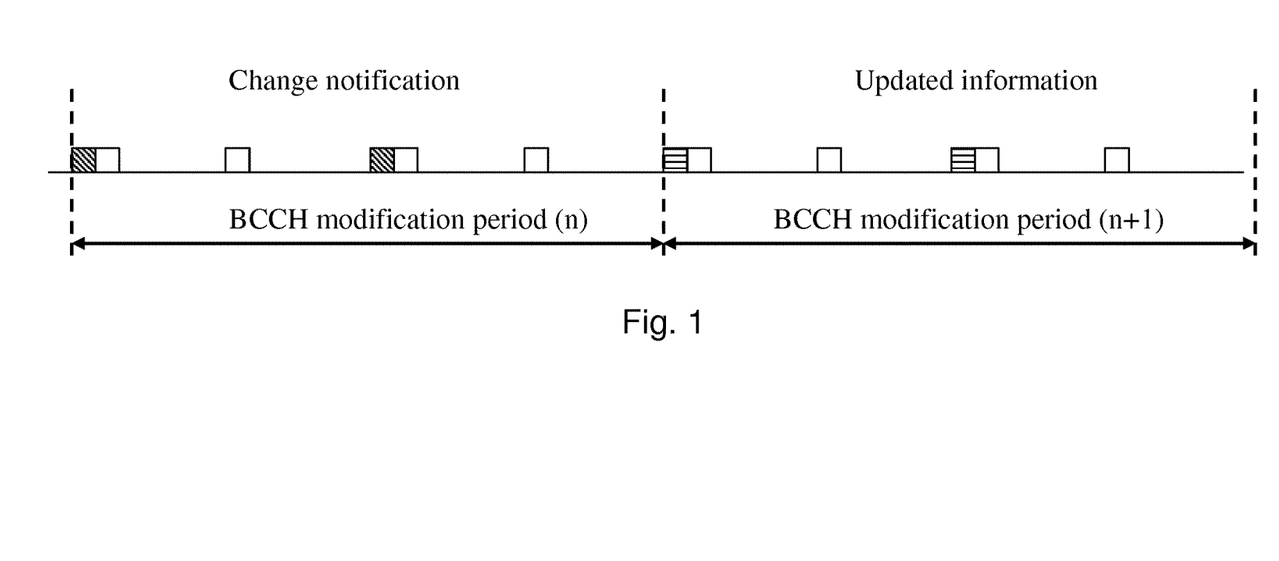
FIG. 1 shows the concept of BCCH modification period.

The concept is shown in FIG. 1, which shows broadcast SIBs over time. Broadcast system information (SI) is comprised of several system information blocks (SIBs) indicated as squares in FIG. 1. In the simple illustration in FIG. 1 hashed squares indicate different SIB from the non-hashed squares. In BCCH modification period (n), the UE is notified on the change of SI, in the example of FIG. 1 about the change of SIB of hashed square. The change of the SI becomes effective at the boundary to the next BCCH modification period (n+1): Diagonal hashing changed to horizontal hashing indicating the change of that particular SIB.

There are two ways for SI change notification:
A paging message is used to inform UEs in RRC_IDLE and UEs in RRC_CONNECTED about a system information change. If the UE receives a paging message including the systemInfoModification message, it knows that the system information will change at the next BCCH modification period boundary.

SystemInformationBlockType1 includes a value tag, systemInfoValueTag, that indicates if a change has occurred in the SI messages, i.e. if any change occurred in SI. E.g. upon return from out of coverage, an UE may use systemInfoValueTag to verify if the previously stored SI messages are still valid.

The UE verifies that stored system information remains valid by either checking systemInfoValueTag in SystemInformationBlockType1 after the BCCH modification period boundary, or attempting to find the systemInfoModification indication at least modificationPeriodCoeff times during the BCCH modification period in case no paging is received, in every BCCH modification period. According to 3GPP TS 36.331, the BCCH modification period may be calculated as follows:

BCCH modification period=
modificationPeriodCoeff*defaultPagingCycle, wherein the BBCH modification period and the default paging cycle are expressed in number of radio frames.

In general, there are one or more paging occasions during each BCCH modification period.

In RAN #67, a work item for release 13 RAN enhancements for extended DRX in LTE was agreed [2], with the objectives to extend DRX for UEs in IDLE (RRC_IDLE) mode (also named "I-eDRX") and CONNECTED (RRC-CONNECTED) mode for UE power saving. The length of extended DRX is 5.12 or 10.24 seconds for RRC_CONNECTED, but can be beyond 10.24 seconds for RRC_IDLE. Maximum value of the eDRX for RRC_IDLE is 43.69 minutes which is 256 times 10.24 s.

When the extended DRX length is much larger than the BCCH modification period, the UE might miss paging for SI modification notification, and there is a potential risk of the valueTag (systemInfoValueTag) in SIB1 wrapping around during eDRX. Namely, the valueTag is a numerical value which is updated at every change of SI, e.g. by incrementing 1. If the maximum value of the valueTag is reached, it is reset to 0, and then incremented again. Thus, after a maximum number of SI changes, the valueTAG has the same value again (wrapped around). The valueTag is presented with 5 bits allowing values between 0 and 31.

Options for the SI update that have been proposed are the following:
1) UE checks the systemInfoValueTag in SIB1 just before it has to become reachable within I-eDRX cycle; details explained below:
   Case a) If the I-eDRX is shorter than the BCCH modification period, the UE behaves as legacy, i.e. it follows SI change notification for common SIBs through paging.

Case b) If the I-eDRX is longer than the BCCH modification period, the UE checks the systemInfoValueTag in SIB1 just before becoming reachable in its paging occasion (referring to the time window when this UE may be paged in its specific PO/PF). This case implies that the UE can ignore the systemInfoModification notifications conveyed in paging message while in I-eDRX.

2) UE checks the systemInfoValueTag in SIB1 once per I-eDRX cycle. This option implies that the UE can ignore the systemInfoModification notifications conveyed in paging message while in I-eDRX.
3) UE behaves as legacy i.e. it follows SI change notification for common SIBs through paging.
4) UE reads the system information always when the eDRX is longer than the 32*BCCH modification period which is the minimum time for wrap-around of the SI value tag (5 bit information in SIB1). Otherwise the UE relies on the value tag indication.

In general, it is an intention to minimize the cases when the UE has to read system information while it is still being kept updated with the SI modifications.

A problem with the $1^{st}$ option is the un-optimized UE behaviour as the UE has to read at least SIB1 each time the length of eDRX is longer than the BCCH modification period.

The $2^{nd}$ option forces UE to read the SIB1 always when waking up from eDRX. That will not be desirable as the eDRX is meant to minimize UE activity and thus the power consumption.

The option 3 has the problem that the UE will miss the SI change notifications sent with one or more paging messages during the sleep time of the eDRX cycle. When waking up, the UE will not be aware nor given an indication about the changes of SI except the value tag (which has its own problems, i.e., may be wrapped around).

The $4^{th}$ option is a feasible solution but the time triggering the SIB reading can be unnecessarily short when the configured BCCH modification period is short and the eDRX period exceeds that period. Hence, the option does not result in minimum possible power consumption.

In practical implementations and network operation, the system information does not change very frequently, so reading all SIBs just in case there was a wrap-around consumes a lot of power. Avoiding reading the SIBs when they have not changed would be beneficial.

REFERENCES

[1] 3GPP TS 36.331: Radio Resource Control (RRC) Protocol Specification
[2] 3GPP RP-150493 RAN enhancements for extended DRX in LTE

SUMMARY OF THE INVENTION

It is an object of the present invention to improve the prior art.

According to a first aspect of the invention, there is provided an apparatus, comprising at least one processor and at least one memory including computer program code, wherein the at least one processor, with the at least one memory and the computer program code, is arranged to cause the apparatus to at least perform monitoring if a system information of a cell is updated; informing a management entity on the updating of the system information if the system information is updated; monitoring if a request to page a terminal by a paging message is received; paging the terminal with the paging message if the request is received, wherein the paging message comprises an indication on the update.

The apparatus may further perform evaluating if the updating of the system information is relevant for the terminal; and, if the updating of the system information is not relevant for the terminal, at least one of inhibiting the informing of the management entity on the updating; and inhibiting the paging of the terminal with the paging message.

The apparatus may further perform checking if the request to page the terminal comprises duration information indicating a duration during which the terminal was asleep.

The evaluating may comprise checking if the updating of the system information occurred while the terminal was asleep; and evaluating the updating of the system information as not relevant for the terminal if the updating of the system information occurred while the terminal was not asleep.

The management entity may be informed on the updating by at least one of informing which system information block of one or more system information blocks is updated; and informing which value tag of one or more value tags is updated; wherein the system information is defined by the one or more system information blocks, and each of the one or more value tags is related to one or more of the one or more system information blocks and updated when one of the respective one or more system information block is updated.

The apparatus may further perform supervising if the request to page the terminal comprises a notification that the paging message comprises an indication on plural updates of the system information; wherein the terminal may be paged with the paging message comprising the indication on the plural updates if the request comprises the notification that the paging message comprises the indication on the plural updates.

According to a second aspect of the invention, there is provided an apparatus, comprising at least one processor and at least one memory including computer program code, wherein the at least one processor, with the at least one memory and the computer program code, is arranged to cause the apparatus to at least perform monitoring if an information on an update of a system information of a first cell is received; checking if a terminal is registered as being served by at least one cell of a group of one or more cells comprising the first cell; checking if the terminal becomes reachable after being asleep; requesting to page the terminal by a paging message if the information on the update is received, the terminal is served by the at least one cell of the group, and the terminal becomes reachable, wherein the paging message comprises an indication on the update.

The apparatus may further perform evaluating if the update of the system information is relevant for the terminal; inhibiting the requesting of the paging if the update is not relevant for the terminal.

The request to page the terminal may comprise a duration information indicating a duration of a time during which the terminal was asleep.

The information on the update may comprise at least one of an information which system information block of one or more system information blocks is updated; and an information which value tag of one or more value tags is updated.

The apparatus may further perform supervising if the received information comprises information on plural updates of the system information; wherein the request to page the terminal may comprise a notification that the paging message comprises an indication on the plural updates if the received information comprises information on the plural updates.

According to a third aspect of the invention, there is provided an apparatus, comprising first monitoring means adapted to monitor if a system information of a cell is updated; informing means adapted to inform a management entity on the updating of the system information if the system information is updated; second monitoring means adapted to monitor if a request to page a terminal by a paging message is received; paging means adapted to page the terminal with the paging message if the request is received, wherein the paging message comprises an indication on the update.

The apparatus may further comprise evaluating means adapted to evaluate if the updating of the system information is relevant for the terminal; and inhibiting means adapted to, if the updating of the system information is not relevant for the terminal, at least one of inhibit the informing of the management entity on the updating; and inhibit the paging of the terminal with the paging message.

The apparatus may further comprise checking means adapted to check if the request to page the terminal comprises duration information indicating a duration during which the terminal was asleep.

The evaluating by the evaluating means may comprise checking if the updating of the system information occurred while the terminal was asleep; and evaluating the updating of the system information as not relevant for the terminal if the updating of the system information occurred while the terminal was not asleep.

The management entity may be informed on the updating by at least one of informing which system information block of one or more system information blocks is updated; and informing which value tag of one or more value tags is updated; wherein the system information is defined by the one or more system information blocks, and each of the one or more value tags is related to one or more of the one or more system information blocks and updated when one of the respective one or more system information block is updated.

The apparatus may further comprise supervising means adapted to supervise if the request to page the terminal comprises a notification that the paging message comprises an indication on plural updates of the system information; wherein the terminal may be paged with the paging message comprising the indication on the plural updates if the request comprises the notification that the paging message comprises the indication on the plural updates.

According to a fourth aspect of the invention, there is provided an apparatus, comprising monitoring means adapted to monitor if an information on an update of a system information of a first cell is received; first checking means adapted to check if a terminal is registered as being served by at least one cell of a group of one or more cells comprising the first cell; second checking means adapted to check if the terminal becomes reachable after being asleep; requesting means adapted to request to page the terminal by a paging message if the information on the update is received, the terminal is served by the at least one cell of the group, and the terminal becomes reachable, wherein the paging message comprises an indication on the update.

The apparatus may further comprise evaluating means adapted to evaluate if the update of the system information is relevant for the terminal; inhibiting means adapted to inhibit the requesting of the paging if the update is not relevant for the terminal.

The request to page the terminal may comprise a duration information indicating a duration of a time during which the terminal was asleep.

The information on the update may comprise at least one of an information which system information block of one or more system information blocks is updated; and an information which value tag of one or more value tags is updated.

The apparatus may further comprise supervising means adapted to supervise if the received information comprises information on plural updates of the system information; wherein the request to page the terminal may comprise a notification that the paging message comprises an indication on the plural updates if the received information comprises information on the plural updates.

According to a fifth aspect of the invention, there is provided an apparatus, comprising first monitoring circuitry configured to monitor if a system information of a cell is updated; informing circuitry configured to inform a management entity on the updating of the system information if the system information is updated; second monitoring circuitry configured to monitor if a request to page a terminal by a paging message is received; paging circuitry configured to page the terminal with the paging message if the request is received, wherein the paging message comprises an indication on the update.

The apparatus may further comprise evaluating circuitry configured to evaluate if the updating of the system information is relevant for the terminal; and inhibiting circuitry configured to, if the updating of the system information is not relevant for the terminal, at least one of inhibit the informing of the management entity on the updating; and inhibit the paging of the terminal with the paging message.

The apparatus may further comprise checking circuitry configured to check if the request to page the terminal comprises duration information indicating a duration during which the terminal was asleep.

The evaluating by the evaluating circuitry may comprise checking if the updating of the system information occurred while the terminal was asleep; and evaluating the updating of the system information as not relevant for the terminal if the updating of the system information occurred while the terminal was not asleep.

The management entity may be informed on the updating by at least one of informing which system information block of one or more system information blocks is updated; and informing which value tag of one or more value tags is updated; wherein the system information is defined by the one or more system information blocks, and each of the one or more value tags is related to one or more of the one or more system information blocks and updated when one of the respective one or more system information block is updated.

The apparatus may further comprise supervising circuitry configured to supervise if the request to page the terminal comprises a notification that the paging message comprises an indication on plural updates of the system information; wherein the terminal may be paged with the paging message comprising the indication on the plural updates if the request comprises the notification that the paging message comprises the indication on the plural updates.

According to a sixth aspect of the invention, there is provided an apparatus, comprising monitoring circuitry configured to monitor if an information on an update of a system information of a first cell is received; first checking circuitry configured to check if a terminal is registered as being served by at least one cell of a group of one or more cells comprising the first cell; second checking circuitry configured to check if the terminal becomes reachable after being asleep; requesting circuitry configured to request to page the terminal by a paging message if the information on the update is received, the terminal is served by the at least one cell of the group, and the terminal becomes reachable, wherein the paging message comprises an indication on the update.

The apparatus may further comprise evaluating circuitry configured to evaluate if the update of the system information is relevant for the terminal; inhibiting circuitry configured to inhibit the requesting of the paging if the update is not relevant for the terminal.

The request to page the terminal may comprise a duration information indicating a duration of a time during which the terminal was asleep.

The information on the update may comprise at least one of an information which system information block of one or more system information blocks is updated; and an information which value tag of one or more value tags is updated.

The apparatus may further comprise supervising circuitry configured to supervise if the received information comprises information on plural updates of the system information; wherein the request to page the terminal may comprise a notification that the paging message comprises an indication on the plural updates if the received information comprises information on the plural updates.

According to a seventh aspect of the invention, there is provided a method, comprising monitoring if a system information of a cell is updated; informing a management entity on the updating of the system information if the system information is updated; monitoring if a request to page a terminal by a paging message is received; paging the terminal with the paging message if the request is received, wherein the paging message comprises an indication on the update.

The method may further comprise evaluating if the updating of the system information is relevant for the terminal; and, if the updating of the system information is not relevant for the terminal, at least one of inhibiting the informing of the management entity on the updating; and inhibiting the paging of the terminal with the paging message.

The method may further comprise checking if the request to page the terminal comprises duration information indicating a duration during which the terminal was asleep.

The evaluating may comprise checking if the updating of the system information occurred while the terminal was asleep; and evaluating the updating of the system information as not relevant for the terminal if the updating of the system information occurred while the terminal was not asleep.

The management entity may be informed on the updating by at least one of informing which system information block of one or more system information blocks is updated; and informing which value tag of one or more value tags is updated; wherein the system information is defined by the one or more system information blocks, and each of the one or more value tags is related to one or more of the one or more system information blocks and updated when one of the respective one or more system information block is updated.

The method may further comprise supervising if the request to page the terminal comprises a notification that the paging message comprises an indication on plural updates of the system information; wherein the terminal may be paged with the paging message comprising the indication on the plural updates if the request comprises the notification that the paging message comprises the indication on the plural updates.

According to an eighth aspect of the invention, there is provided a method, comprising monitoring if an information on an update of a system information of a first cell is received; checking if a terminal is registered as being served by at least one cell of a group of one or more cells comprising the first cell; checking if the terminal becomes reachable after being asleep; requesting to page the terminal by a paging message if the information on the update is received, the terminal is served by the at least one cell of the group, and the terminal becomes reachable, wherein the paging message comprises an indication on the update.

The method may further comprise evaluating if the update of the system information is relevant for the terminal; inhibiting the requesting of the paging if the update is not relevant for the terminal.

The request to page the terminal may comprise a duration information indicating a duration of a time during which the terminal was asleep.

The information on the update may comprise at least one of an information which system information block of one or more system information blocks is updated; and an information which value tag of one or more value tags is updated.

The method may further comprise supervising if the received information comprises information on plural updates of the system information; wherein the request to page the terminal may comprise a notification that the paging message comprises an indication on the plural updates if the received information comprises information on the plural updates.

The method according to each of the seventh and eighth aspects may be a method of updating system information.

According to a ninth aspect of the invention, there is provided a computer program product comprising a set of instructions which, when executed on an apparatus, is configured to cause the apparatus to carry out the method according to any of the seventh and eighth aspects. The computer program product may be embodied as a computer-readable medium or directly loadable into a computer.

According to some example embodiments of the invention, at least one of the following technical effects may be provided:
- UE behaviour is basically the legacy behaviour even with eDRX (downwards compatibility).
- Not affecting the legacy UEs, i.e. BCCH modification period can be optimized for legacy operation without negatively affecting the UE behaviour with eDRX.
- The minimum possible UE activity (i.e. maximum UE power savings) can be reached without unnecessary SIB reading.
- No issues with the valueTag and possible wrap-around of it.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of example embodiments of the present invention which is to be taken in conjunction with the appended drawings, wherein.

DETAILED DESCRIPTION OF CERTAIN
EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In order to avoid the problems with the proposed solutions to the SI update with a long I-eDRX period and minimized UE power consumption discussed above, some embodiments of the invention provide a modification to the procedure of the option 3, wherein paging is used for the SI update indication.

Namely, MME is responsible for the paging transmission for eDRX UEs also in case when indicating about SI change, i.e., eNB pages eDRX UEs upon request from the respective MME.

The procedure according to some embodiments of the invention may be as follows:

eNB sends the paging notifications for the SI update and updates the valueTag at each SI change (update).

Each time the SI is changed, eNB informs MME about the change:

In some embodiments, eNB informs MME only that a change occurred;

In some embodiments, eNB informs MME which SIB(s) have changed;

In some embodiments, eNB informs MME which valueTag has been changed, if there are multiple valueTags (e.g. a value Tag for MIB and a valueTAG for a SIB or multiple SIBs).

If there are plural MMEs in the network, eNB may inform all MMEs, or MME may inform only MMEs managing UEs which are currently served by the eNB.

MME keeps track on the UEs in eDRX and each time one of them will become reachable, MME shall instruct eNB to send paging with the indication about the updated SI in case the SI has been modified once or multiple times:

This procedure will be the same regardless of the number of SI modifications, even a wrap-around of the value tag may have happened.

If the respective information is available at the MME from the information received from eNB, the SI update indication may refer to one or more specific SIB(s), separately for multiple valueTags (e.g. for MIB and SIB), or for any SI change.

If MME determines that the modified SIBs are not affecting the UE in eDRX (e.g. if the UE does not support multi-RAT, changes in SIB6, SIB7 or SIB8 may be ignored; if UE does not support MBMS changes in SIB13 and SIB15 may be ignored, etc.), in some embodiments of the invention, MME does not request eNB to page the UE. As one example, if SI was changed twice while UE was asleep and the second change cancels the first change, MME may not request the eNB to page the UE.

UE waking up after the eDRX sleep period will be paged (according to specified procedure for eDRX using the parameters for PO/PF calculation valid prior to the eDRX sleep time) including the indication for SI update in case the SI update has happened while UE has been asleep.

In some embodiments, MME may indicate to eNB the length of the used eDRX cycle (i.e. how long the UE was asleep) from which the eNB can determine which SIBs have changed during the sleep time.

If eNB determines that the modified SIBs are not affecting the UE in eDRX (e.g., see the examples provided hereinabove), SI update indication from eNB to UE may be omitted. As one example, if SI was changed twice while UE was asleep and the second change cancels the first change, eNB may not page UE with SI update indication.

When receiving the indication about the SI update in the paging message, the UE will Read all system information or the system information relevant for it; or Read SIB1 and SIB2 and establishes an RRC connection on which the eNB sends the updated SIB(s) by dedicated signalling.

The indication about SI update in the paging message may also comprise information which SIBs have been updated. In this case, the UE may only read the updated SIBs (and SIB 1 in order to identify the location of the updated SIBs, if necessary).

In some embodiments of the invention, eNB indicates on the S1 interface between eNB and MME the SI update. In some embodiments, eNB indicates only a SI change if it may affect UEs in eDRX. Some example criteria to decide whether or not a SI change affects the UE are indicated hereinabove. The information may comprise one or more bits.

The SI update indication may be sent in one or more of the existing S1 messages (e.g. 'eNB Configuration Update'—message) or in a new message specified for this purpose. The SI update indication may include implicit or explicit information about the SIB(s) that have changed.

In some embodiments of the invention, the paging request on the S1 interface from MME to eNB comprises an IE indicating that an SI update was performed and, hence, SI reading has to be done by the UE.

In some embodiments, the paging request may be specific to indicate an update of the SI and, thus, to make the UE reading the updated SI, but it may additionally initiate a normal connection setup. I.e., the paging message to initiate a normal connection setup may comprise the indication of an update of the SI. I.e., in some embodiments, the paging to initiate a normal connection setup may be considered as an event where the terminal becomes reachable after being asleep.

In some embodiments, paging transmission by the eNB is basically the same as in normal case except for one or more of the features described hereinabove. Similarly, in some embodiments the UE behaviour may be basically conventional except for the longer eDRX period.

Some embodiments of the invention are applicable especially in the case where the UE is a stationary or low mobility MTC UE. In that case, MME can page the UE first in the cell where the UE has been camping. If no response in that cell, MME shall extend the coverage of the paging by sending the paging request to multiple cells (e.g. to the tracking area). Such progressing paging transmission has been agreed for the low cost/complexity or coverage enhanced MTC UE.

Figure 2:
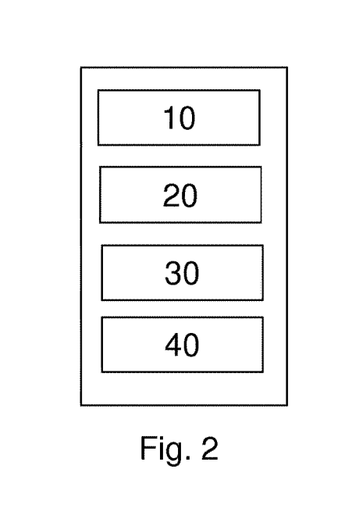
FIG. 2 shows an apparatus according to an example embodiment of the invention.
Figure 3:
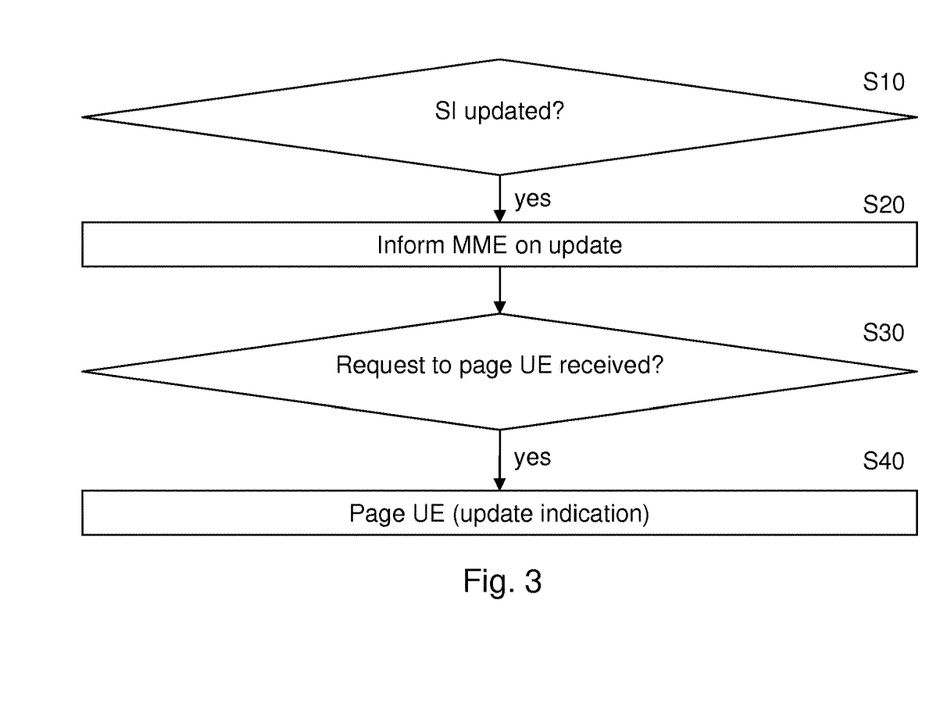
FIG. 3 shows a method according to an example embodiment of the invention.

FIG. 2 shows an apparatus according to an example embodiment of the invention. The apparatus may be a base station such as a NodeB or eNodeB, or an element thereof. FIG. 3 shows a method according to an example embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises first monitoring means 10, informing means 20, second monitoring means 30 and paging means 40. The first monitoring means 10, informing means 20, second monitoring means 30 and paging means 40 may be a first monitoring circuitry, informing circuitry, second monitoring circuitry and paging circuitry, respectively.

The first monitoring circuitry 10 monitors if a system information of a cell is updated (S10).

If the system information is updated (S10="yes"), the first informing means 20 informs a management entity (e.g. MME) on the updating of the system information (S20).

The second monitoring means 30 monitors if a request to page a terminal by a paging message is received (S30). The paging message comprises an indication on the update of the system information, i.e. the request indicates that the paging message has to comprise an indication on the update.

If the request is received (S30="yes"), the paging means 40 pages the terminal with the paging message (S40), i.e. with the paging message comprising the indication on the update of the system information. For example, the paging may be performed in the cell of the updated SI or in a larger area (e.g. tracking area) comprising the cell.

Figure 4:
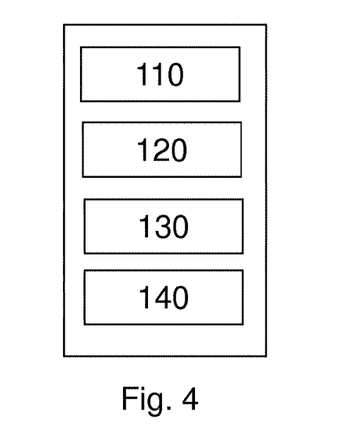
FIG. 4 shows an apparatus according to an example embodiment of the invention.
Figure 5:
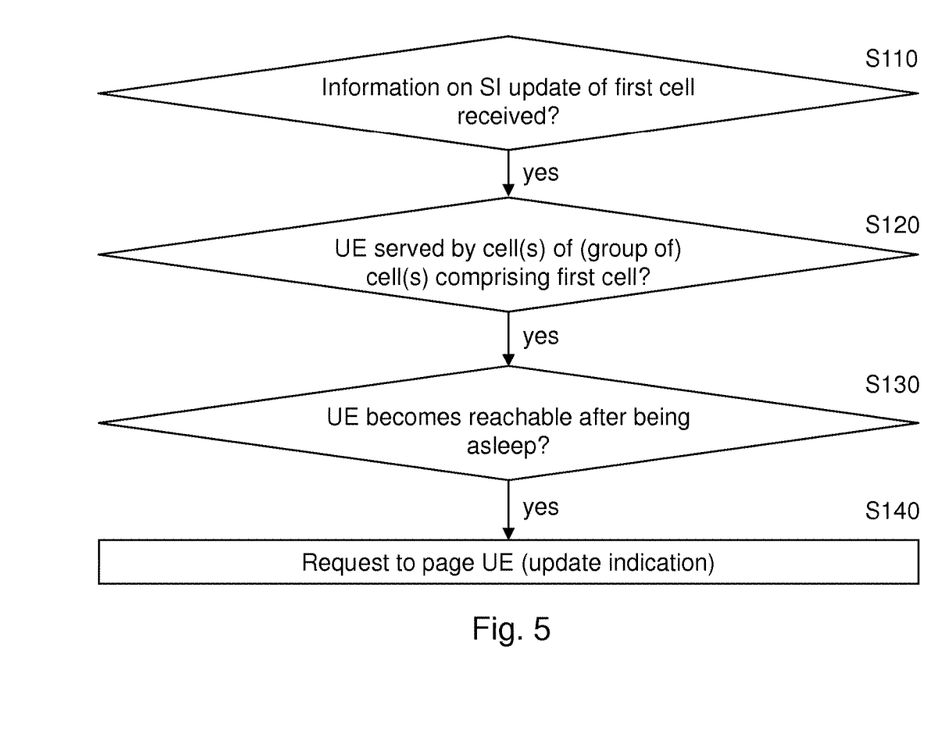
FIG. 5 shows a method according to an example embodiment of the invention.

FIG. 4 shows an apparatus according to an example embodiment of the invention. The apparatus may be a management entity such as a MME, or an element thereof. FIG. 5 shows a method according to an example embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises monitoring means 110, first checking means 120, second checking means 130, and requesting means 140. The monitoring means 110, first checking means 120, second checking means 130, and requesting means 140 may be monitoring circuitry, first checking circuitry, second checking circuitry, and requesting circuitry, respectively.

The monitoring means 110 monitors if an information on an update of a system information of a first cell is received (S110).

The first checking means 120 checks if a terminal is registered as being served by the first cell or by at least one cell of a group of cells comprising the first cell (S120). The group of cells may be a tracking area. For example, the terminal is registered as being served by the first cell if it is in RRC_Connected mode or in RRC_idle mode in the first cell. The terminal may have been configured for eDRX which is known by the management entity. It may even be out of coverage. In some embodiments, the first checking means checks if the terminal is in the first cell in RRC_idle mode.

The second checking means 130 checks if the terminal becomes reachable after being asleep (S130). In some embodiments, where the first checking means checks if the terminal is in RRC_idle mode in the first cell, the second checking means 130 only checks if the terminal becomes reachable.

The sequence of S120 and S130 may be arbitrary. S120 and S130 may be performed fully or partly simultaneously. In some embodiments, S130 is only performed if the S120 was affirmative. In some embodiments, S120 is only performed if S130 is affirmative. In some embodiments, S120 and S130 are always performed. The first checking means and the second checking means may be integrated in a single checking means performing both S120 and S130.

If the information on the update is received (S110="yes"), and the terminal is registered (S120="yes"), and the terminal becomes reachable (S130=yes"), the requesting means 140 requests to page the terminal by a paging message comprising an indication on the update (S140).

Figure 6:
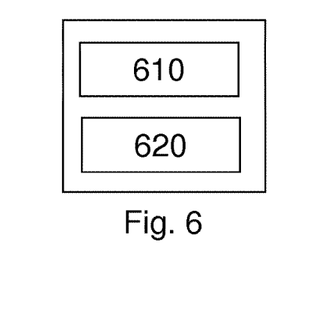
FIG. 6 shows an apparatus according to an example embodiment of the invention.

FIG. 6 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 3 and 5 and related description.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

Some example embodiments of the invention may be applied to a 5G network. However, some example embodiments may be applied to other radio access technologies offering a single frequency network, such as some 3GPP networks (e.g. LTE, LTE-A). Some embodiments of the invention may be applied to wired access technologies offering discontinuous reception, too.

A terminal may be any kind of terminal which may attach to the respective network. E.g., a terminal may be a UE, a device of a machine-type communication, a laptop, a smartphone, a mobile phone etc.

According to the above description, it should thus be apparent that example embodiments of the present invention provide, for example a management entitiy such as a MME, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a base station such as a NodeB or an eNodeB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. An apparatus, comprising at least one processor and at least one memory including computer program code, wherein the at least one processor, with the at least one memory and the computer program code, is arranged to cause the apparatus to at least perform
monitoring, by a base station in a wireless network, whether a system information of a cell is updated;
informing by the base station a management entity in the wireless network on the updating of the system information in response to the system information being updated;
monitoring by the base station whether a request to page a terminal by a paging message is received from the management entity, wherein the request is received in response to the terminal becoming reachable after being asleep;
paging by the base station the terminal with the paging message in response to the request being received, wherein the paging message comprises an indication on the update.

2. The apparatus according to claim 1, wherein the at least one processor, with the at least one memory and the computer program code, is arranged to cause the apparatus to further perform
evaluating whether a given updating of system information for the cell is relevant for the terminal; and,
in response to the given updating of the system information being not relevant for the terminal, at least one of
inhibiting the informing of the management entity on the given updating; and
inhibiting the paging of the terminal with the paging message.

3. The apparatus according to claim 1, wherein the at least one processor, with the at least one memory and the computer program code, is arranged to cause the apparatus to further perform
checking for a given updating of the system information for the cell whether the request to page the terminal comprises duration information indicating a duration during which the terminal was asleep.

4. The apparatus according to claim 3:
wherein the at least one processor, with the at least one memory and the computer program code, is arranged to cause the apparatus to further perform
evaluating whether the updating of the system information is relevant for the terminal based on the duration during which the terminal was asleep; and,
in response the given updating of the system information being not relevant for the terminal, at least one of
inhibiting the informing of the management entity on the given updating; and
inhibiting the paging of the terminal with the paging message;
wherein the evaluating comprises
checking whether the given updating of the system information occurred while the terminal was asleep; and
evaluating the given updating of the system information as not relevant for the terminal in response to the updating of the system information having occurred while the terminal was not asleep.

5. The apparatus according to claim 1, wherein the management entity is informed on the updating by at least one of
informing which system information block of one or more system information blocks is updated; and
informing which value tag of one or more value tags is updated; wherein
the system information is defined by the one or more system information blocks, and
each of the one or more value tags is related to one or more of the one or more system information blocks and updated when one of the respective one or more system information block is updated.

6. The apparatus according to claim 1, wherein the at least one processor, with the at least one memory and the computer program code, is arranged to cause the apparatus to further perform
supervising whether the request to page the terminal comprises a notification that the paging message comprises an indication on plural updates of the system information; wherein
the terminal is paged with the paging message comprising the indication on the plural updates in response to the request comprising the notification that the paging message comprises the indication on the plural updates.

7. An apparatus, comprising at least one processor and at least one memory including computer program code, wherein the at least one processor, with the at least one memory and the computer program code, is arranged to cause the apparatus to at least perform
receiving by a management entity in a wireless network information on an update of a system information of a first cell;
determining by the management entity that a terminal is registered as being served by at least one cell of a group of one or more cells comprising the first cell, but that the terminal is not reachable because the terminal is asleep;
determining by the management entity that the terminal becomes reachable after being asleep;
requesting in response to the terminal becoming reachable, by the management entity and to a base station in the wireless network, to page the terminal by a paging message based on the information on the update, wherein the paging message comprises an indication on the update.

8. The apparatus according to claim 7, wherein the at least one processor, with the at least one memory and the computer program code, is arranged to cause the apparatus to further perform
evaluating whether a given update of system information for the cell is relevant for the terminal;
inhibiting the requesting of the paging in response to the given update being not relevant for the terminal.

9. The apparatus according to claim 7, wherein
the request to page the terminal comprises a duration information indicating a duration of a time during which the terminal was asleep.

10. The apparatus according to claim 7, wherein the information on the update comprises at least one of
an information which system information block of one or more system information blocks is updated; and
an information which value tag of one or more value tags is updated.

11. The apparatus according to claim 7, wherein the at least one processor, with the at least one memory and the computer program code, is arranged to cause the apparatus to further perform
supervising whether the received information comprises information on plural updates of the system information; wherein
the request to page the terminal comprises a notification that the paging message comprises an indication on the plural updates in response to the received information comprising information on the plural updates.

12. A method, comprising
monitoring, by a base station in a wireless network, whether a system information of a cell is updated;
informing by the base station a management entity in the wireless network on the updating of the system information in response to the system information being updated;
monitoring by the base station whether a request to page a terminal by a paging message is received from the management entity, wherein the request is received in response to the terminal becoming reachable after being asleep;
paging by the base station the terminal with the paging message in response to the request being received, wherein the paging message comprises an indication on the update.

13. The method according to claim 12, further comprising
evaluating whether the updating of system information for a given updating of the system information for the cell is relevant for the terminal; and,
in response to the given updating of the system information not being relevant for the terminal, at least one of
inhibiting the informing of the management entity on the given updating; and
inhibiting the paging of the terminal with the paging message.

14. The method according to claim 12, further comprising
checking for a given updating of the system information for the cell whether the request to page the terminal comprises duration information indicating a duration during which the terminal was asleep.

15. The method according to claim 12, wherein the evaluating comprises
checking whether the updating of the system information occurred while the terminal was asleep; and
evaluating the updating of the system information as not relevant for the terminal in response to the updating of the system information having occurred while the terminal was not asleep.

16. The method according to claim 12, wherein the management entity is informed on the updating by at least one of
informing which system information block of one or more system information blocks is updated; and
informing which value tag of one or more value tags is updated; wherein
the system information is defined by the one or more system information blocks, and
each of the one or more value tags is related to one or more of the one or more system information blocks and updated when one of the respective one or more system information block is updated.

17. The method according to claim 12, further comprising
supervising whether the request to page the terminal comprises a notification that the paging message comprises an indication on plural updates of the system information; wherein
the terminal is paged with the paging message comprising the indication on the plural updates in response to the request comprising the notification that the paging message comprises the indication on the plural updates.

18. A method, comprising
receiving by a management entity in a wireless network information on an update of a system information of a first cell;
determining by the management entity that checking whether a terminal is registered as being served by at least one cell of a group of one or more cells comprising the first cell, but that the terminal is not reachable because the terminal is asleep;
determining by the management entity that the terminal becomes reachable after being asleep;
requesting in response to the terminal becoming reachable, by the management entity and to a base station in the wireless network, to page the terminal by a paging message based on the information on the update, wherein
the paging message comprises an indication on the update.

19. The method according to claim 18, further comprising
evaluating whether a given update of the system information for the cell is relevant for the terminal;
inhibiting the requesting of the paging in response to the given update not being relevant for the terminal.

20. The method according to claim 18, wherein
the request to page the terminal comprises a duration information indicating a duration of a time during which the terminal was asleep.

21. The method according to claim 18, wherein the information on the update comprises at least one of
an information which system information block of one or more system information blocks is updated; and
an information which value tag of one or more value tags is updated.

22. The method according to claim 18, further comprising
supervising whether the received information comprises information on plural updates of the system information; wherein
the request to page the terminal comprises a notification that the paging message comprises an indication on the plural updates in response to the received information comprising information on the plural updates.

* * * * *

UNITED STATES PATENT AND TRADEMARK OFFICE
CERTIFICATE OF CORRECTION

PATENT NO. : 10,299,245 B2
APPLICATION NO. : 15/771564
DATED : May 21, 2019
INVENTOR(S) : Ilkka Antero Keskitalo et al.

It is certified that error appears in the above-identified patent and that said Letters Patent is hereby corrected as shown below:

In Claim 18:
Column 16, Line 28, "checking whether" should be deleted.

In Claim 19:
Column 16, Line 42, "the system" should be deleted and --system-- should be inserted.

Signed and Sealed this
Sixteenth Day of July, 2019

Andrei Iancu
*Director of the United States Patent and Trademark Office*